(12) United States Patent
Hook et al.

(10) Patent No.: US 7,302,334 B2
(45) Date of Patent: Nov. 27, 2007

(54) AUTOMATIC MAPPING LOGIC FOR A COMBUSTOR IN A GAS TURBINE ENGINE

(75) Inventors: Richard Bradford Hook, Cincinnati, OH (US); Eric John Kress, Loveland, OH (US); William Lee Barrow, Kings Mills, OH (US); John Bolton, Lake Luzerne, NY (US)

(73) Assignee: General Electric Company, Schenectady, NY (US)

( * ) Notice: Subject to any disclaimer, the term of this patent is extended or adjusted under 35 U.S.C. 154(b) by 524 days.

(21) Appl. No.: 10/064,646

(22) Filed: Aug. 2, 2002

(65) Prior Publication Data

US 2004/0024516 A1 Feb. 5, 2004

(51) Int. Cl.
*G06F 19/00* (2006.01)
*G06G 7/00* (2006.01)

(52) U.S. Cl. .................. 701/100; 701/101; 60/776; 60/39.281; 60/39.27

(58) Field of Classification Search ............ 701/100, 701/101, 102, 103, 104, 105; 60/776, 39.27, 60/39.281, 37.281, 37.27
See application file for complete search history.

(56) References Cited

U.S. PATENT DOCUMENTS

| | | | | |
|---|---|---|---|---|
| 5,487,265 | A | 1/1996 | Rajamani et al. | 60/39.03 |
| 5,636,507 | A | 6/1997 | Rajamani et al. | 60/39.03 |
| 5,857,321 | A | 1/1999 | Rajamani et al. | 60/39.27 |
| 5,896,736 | A | 4/1999 | Rajamani | 60/39.03 |

FOREIGN PATENT DOCUMENTS

EP 0529900 B1 11/1996

(Continued)

OTHER PUBLICATIONS

GE Industrial AeroDerivative Gas Turbines; "GE's New On-Line Remote Diagnostics Offers Ongoing Analysis Of Key Gas Turbine Operating Data"; pp. 1-3; Jun. 1, 1999.

(Continued)

*Primary Examiner*—Jack Keith
*Assistant Examiner*—Ronnie Mancho
(74) *Attorney, Agent, or Firm*—Cantor Colburn LLP

(57) ABSTRACT

A mapping device maps each burner mode at various bleed settings to generate control schedules for a combustion controller that ensure combustion dynamic (acoustic) pressures, and emissions limits and ring flame temperatures are within operational limits. In general, a method of combustor mapping involves adjusting the bulk ring flame temperature to meet emissions and acoustic requirements. The dome (ring) ring flame temperature is then adjusted to determine maximum and minimum ring flame temperature boundary limits. At both the maximum and minimum ring flame temperatures, the emissions levels and acoustic pressures are checked to see that they are within specification limits. If they are not, the bulk ring flame temperature is adjusted, and the entire process is repeated for that bleed setting and burner mode. If the emissions levels and acoustic pressures are within specification limits, then the power is increased to a different mode and bleed setting combination, and the process is again repeated. During each of these steps, mapping data are recorded.

30 Claims, 12 Drawing Sheets

FOREIGN PATENT DOCUMENTS

EP    1067338 A2    1/2001
EP    1331448 A2    7/2003

OTHER PUBLICATIONS

GE Industrial AeroDerivative Gas Turbines; "Dry Low Emissions (DLE)"; pp. 1-3.

General Eletric Aircraft Engines; "Dry Low Emissions Combustor Development"; Narendra D. Joshl, Hukam C. Mongia, Gary Leonard, Jim W. Stegmaier, and Ed C. Vickers; pp. 1-7.

The American Society Of Mechanical Engineers; "Development Of An Aeroderivative Gas Turbine Dry Low Emissions Combustion System"; Gary Leonard and James Stagmaier; pp. 1, 4 and 5.

AUTOMATIC MAPPING LOGIC FOR A COMBUSTOR IN A GAS TURBINE ENGINE

BACKGROUND

Gas turbines are commonly used as a power source to drive electrical generating equipment (such as in an electrical power station) or for propulsion (e.g., for aircraft, marine vessels, or military equipment such as tanks). A combustion type gas turbine has a gas path, which typically includes, in a serial-flow relationship, an air intake (or inlet), a compressor, a combustor, a turbine, and a gas outlet (or exhaust nozzle). A controller governs the operation of the turbine. The controller includes a processor for generating control signals in response to a plurality of turbine operating conditions. Control of the power generated by the gas turbine is typically exercised through control of fuel flow and airflow into the combustor.

Modern gas turbine engines employ a gas-fired ("lean") premixed combustion system, known as a Dry Low Emissions (DLE) combustion system. DLE combustion systems are designed to reduce the emissions of nitrous-oxides (NOx), carbon monoxide (CO), unburned hydrocarbons (UHC), particulates, and other pollutants to levels well below those achievable with older combustion systems. DLE combustion systems employ combustors having a dual or triple dome design, with staging of fuel flow and air flow to achieve lean-premixed operation from light-off to full power. This technology permits the operator to run with reduced emissions of pollutants over a wide load setting, in addition to meeting all other design requirements including high combustion efficiency and low levels of combustion dynamics.

Combustor mapping is the process of measuring operational boundaries for an individual gas turbine engine and translating this data into control schedules for use by the controller of that engine. This process is required for each engine because engine-to-engine (or, more correctly, system-to-system) variability on maximum/minimum operational boundaries and ring flame temperature control may be greater than the allowable operating window. Each engine is required to be mapped during site commissioning to measure and compensate for this variability. Due to the drift or shift of the boundaries with time or due to significant maintenance (replacement of a combustor for example), additional mapping and subsequent control system adjustments are sometimes required during the life of the engine.

Combustor mapping is a manual, iterative process requiring the accurate observation of multiple engine parameters and the manual collection of the observed parameters. These observations must be made for many burner mode and bleed setting combinations. As a result, combustor mapping is tedious, and time consuming, with the potential of human error. In addition, special classroom and hands-on training are required to become qualified to properly map a particular engine. This training increases the money and time cost of the combustor mapping process.

BRIEF SUMMARY OF THE INVENTION

The above-described drawbacks and deficiencies of the prior art are overcome or alleviated by a method for mapping a combustor in a gas turbine engine. The method includes: determining a first burner dome to be adjusted in the gas turbine engine for a first burner mode; adjusting a ring flame temperature at the first burner dome in the gas turbine engine to determine a maximum ring flame temperature boundary for the first burner dome; recording into memory a plurality of parameters from the plurality of sensors coupled to the gas turbine engine operating at the maximum ring flame temperature boundary; adjusting the ring flame temperature at the first burner dome in the gas turbine engine to determine a minimum ring flame temperature boundary for the first burner dome; recording into memory a plurality of parameters from the plurality of sensors coupled to the gas turbine engine operating at the minimum ring flame temperature boundary; subtracting the ring flame temperature at the minimum ring flame temperature boundary from the ring flame temperature at the maximum ring flame temperature boundary to determine a temperature window size; calculating a nominal ring flame temperature from the minimum and maximum ring flame temperatures when the temperature window size is greater than a predetermined minimum window size; adjusting the ring flame temperature in the first burner dome to the nominal ring flame temperature; and recording into memory a plurality of parameters from the sensors coupled to the gas turbine engine operating at the nominal ring flame temperature.

DETAILED DESCRIPTION OF THE INVENTION

Figure 1:
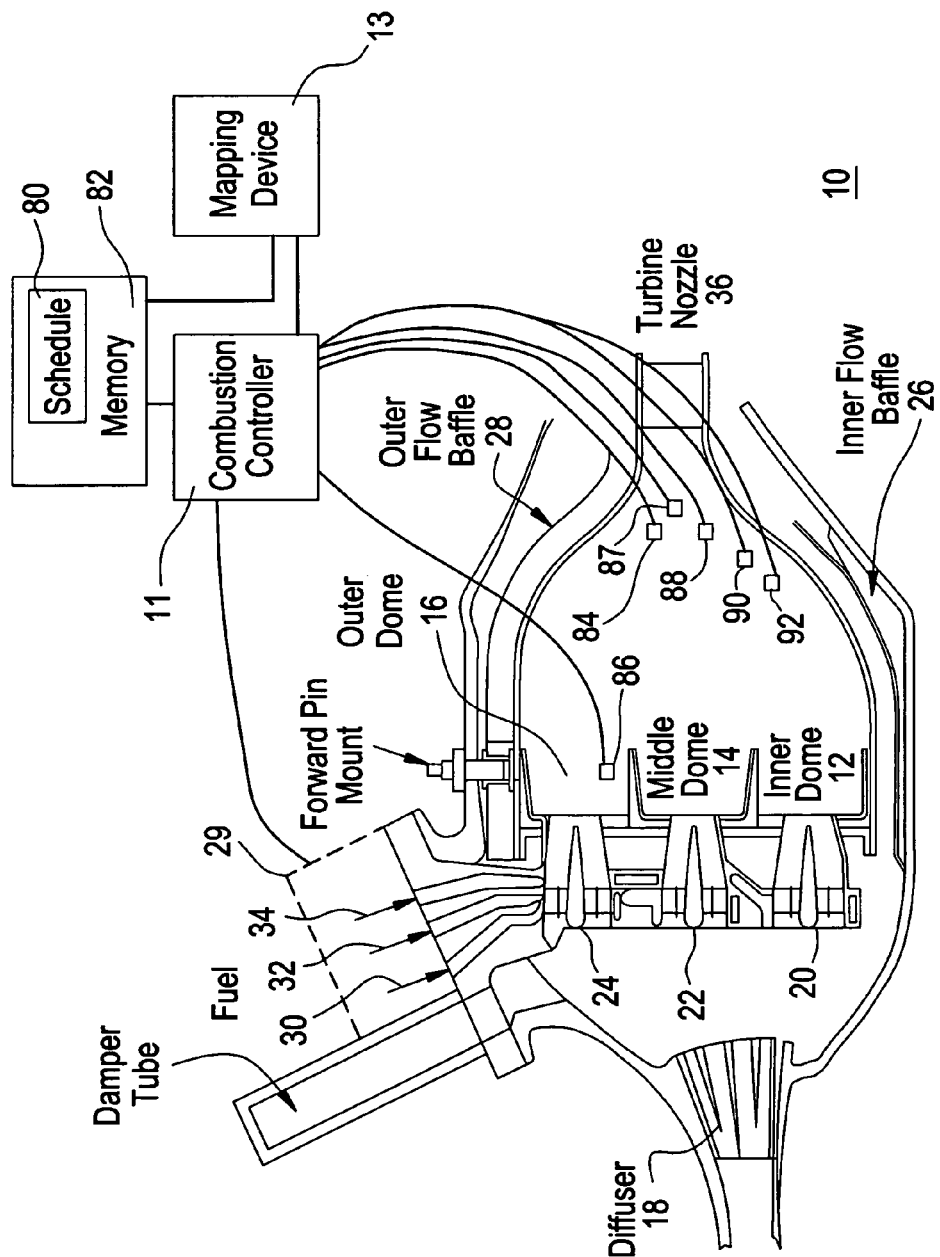
FIG. 1 is a cross sectional view of a DLE combustor.

FIG. 1 shows a cross section of a DLE combustor, generally shown as 10, along with a controller 11 and a mapping device 13. The combustor 10 has three domes (rings) 12, 14, 16 arranged radially to permit parallel staging of the three domes 12, 14, 16. Air enters the combustor 10 via a diffuser 18, where it then passes to a plurality of premixers 20, 22, 24 in the inner, middle and outer domes 12, 14, 16 and to inner and outer flow baffles 26, 28. Air flow in the combustor is controlled by a compressor bleed system (not shown). The middle and outer domes 14, 16 may each consist of 30 premixers 22, 24, while the inner dome 12 may have 15. Pressurized fuel from a fuel delivery system 29 enters the combustor at ports 30, 32, 34 and is injected through holes in each premixer 20, 22, 24, where the air and fuel mix for combustion. After the air/fuel mixture is burned, high-pressure combustion gases exit via turbine nozzle 36.

Controller 11 provides control signals to the fuel delivery system 29 for controlling premixers 12, 14, and 16 within each dome 12, 14, 16. The premixers 12, 14, and 16 are switched on and off for various burner operating modes, such as ignition, idle speed, and changing load levels. For example, the combustor 10 is brought to idle speed by fueling the premixers 22 in the middle dome 14. As load is increased, premixers 20 in the inner dome 12 are also fueled. On further addition of load, the outer dome 16 is lit while the inner dome 12 is switched off. For highest loads, premixers 20, 22, 24 in all domes 12, 14, 16 are fueled.

Figure 2:
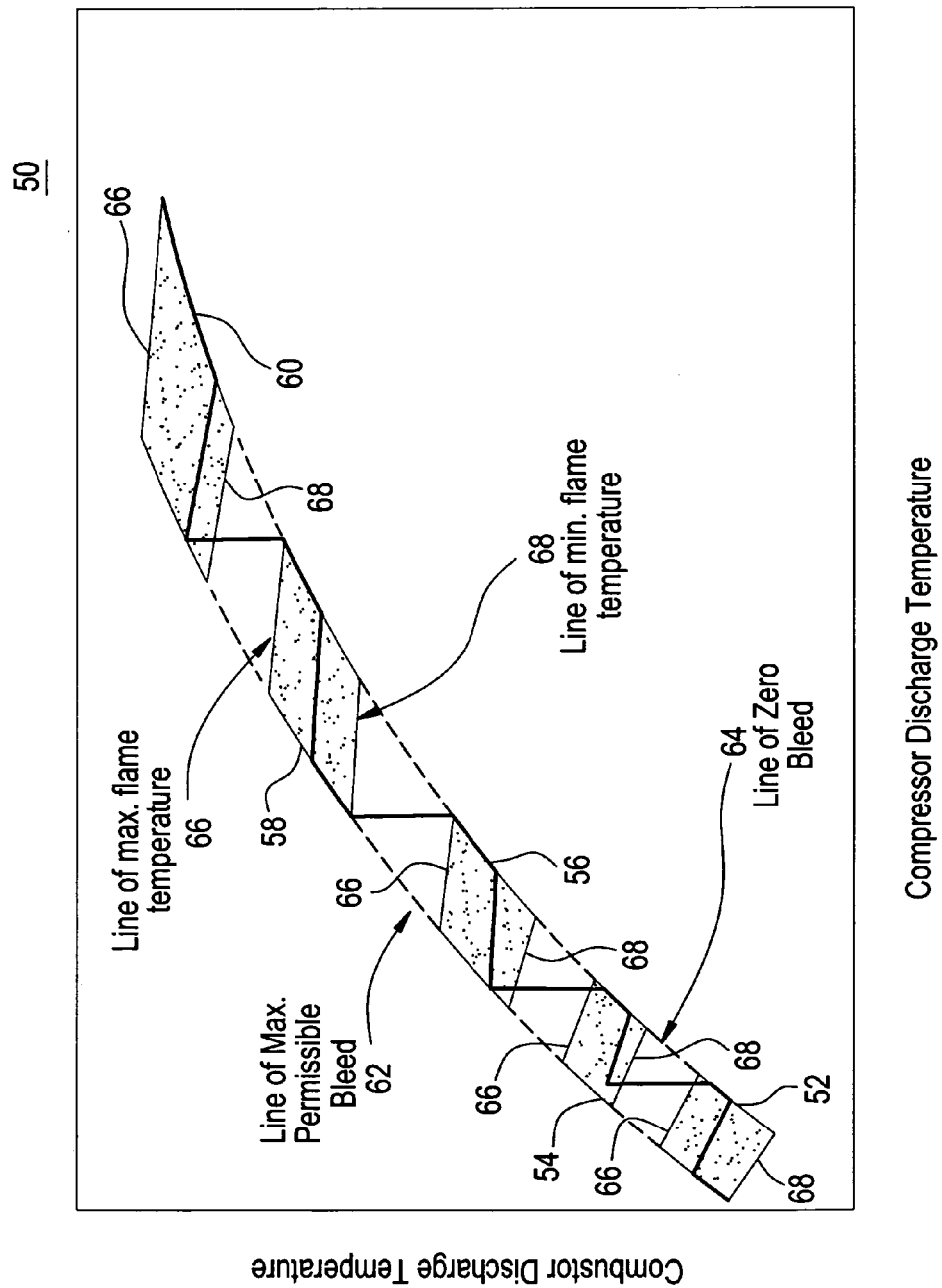
FIG. 2 is a graphical representation of a premixer staging sequence showing five operating modes of a combustor.

FIG. 2 is a graphical representation of a premixer staging sequence, generally shown as 50, showing five operating modes 52, 54, 56, 58, 60 of a combustor. In mode 52, only premixers within the middle dome receive fuel. In mode 54, premixers in the middle dome and some premixers in the inner dome are fueled. In mode 56, premixers in the middle and inner domes are fueled. In mode 58, premixers in the middle and outer domes are fueled, and in mode 60, all premixers are fueled. Precise ring flame temperature control is obtained by the air modulation and fuel flow to the combustor domes. As can be seen, combustor operation in each mode 52, 54, 58, 60 is limited by operational boundaries. These operational boundaries include available bleed modulation (shown by zero bleed and maximum permissible bleed lines 62, 64), which correlates to the available control for combustor airflow. These operational boundaries also include maximum and minimum ring flame temperature limits 66, 68 for each operating mode 52, 54, 56, 58, 60, which are established by lean blowout, liner/dome metal temperatures, combustion dynamic (acoustic) pressures, and emissions limits. The difference between maximum and minimum temperature limits 66, 68 for each mode is the temperature "window" in which the combustor must operate when in that mode.

The combustor's maximum and minimum ring flame temperatures 66, 68, corresponding operating mode 52, 54, 56, 58, 60, and other operational data are stored as control schedules 80 in a memory device 82 for use by the combustor's controller 11. During operation of the combustor 10, the controller 11 monitors and corrects fuel flow and distribution and intake airflow (via compressor bleed) using these pre-programmed control schedules 80. The control schedules 80 are configured to ensure that the controller steers the engine away from its operational boundaries. Memory device 82 is any form of non-volatile memory such as an EPROM (Erasable Programmable Read Only Memory) chip, a disk drive, or the like.

Mapping device 13 determines the appropriate control schedules 80 for combustor 10 by performing a mapping process on combustor 10. Mapping device 13 can be arranged to receive data signals from pressure, temperature, acoustic and emissions sensors 84-92 within the combustor 10. In a preferred embodiment, the sensors 84-92 are pre-existing sensors that typically provide data signals to a controller 11. Sensors 84-92 and controller 11 are commercially available, for example, in General Electric Corporation's DLE type combustors. The functions of various sensors with respect to this invention are described hereinafter.

Mapping device 13 is a computer or custom circuitry capable of accepting data and instructions, executing the instructions to process the data. Mapping device 13 records data, provides a graphical user interface, and downloads control schedule data into memory device 82. Mapping device 13 transmits and receives data to and from the control system 11. Mapping device 13 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

During the process of combustor mapping, mapping device 13 maps each burner mode at various bleed settings to generate control schedules 80 that ensure combustion dynamic (acoustic) pressures, and emissions limits are within the proper range and that the ring flame temperatures provide adequate margin to other operability boundaries such as lean blowout and liner/dome metal temperatures. In general, method of combustor mapping involves, first, stabilizing the engine at a bleed setting in a particular burner mode. Next, the bulk combustor flame temperature is adjusted to meet emissions and acoustic requirements. The individual or ring dome flame temperature is then adjusted to determine maximum and minimum ring flame temperature boundary limits. At both the maximum and minimum ring flame temperatures, the emissions levels and acoustic pressures are checked to see that they are within specification limits. If they are not, the bulk flame temperature is adjusted, and the entire process is repeated for other required domes for that bleed setting and burner mode. If the emissions levels and acoustic pressures are within specification limits, then the power is increased to a different mode and bleed setting combination, and the process is again repeated. During each of these steps, mapping data are recorded. After the data are recorded, the data are used to determine the appropriate control schedule 80 for the controller 11.

FIGS. 3-12 are flow charts depicting a method, generally shown as 100, for combustor mapping of a gas turbine engine system. Method 100 can be programmed into mapping device 11 by software, firmware, or by custom circuitry. As software, method 100 can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Figure 3:
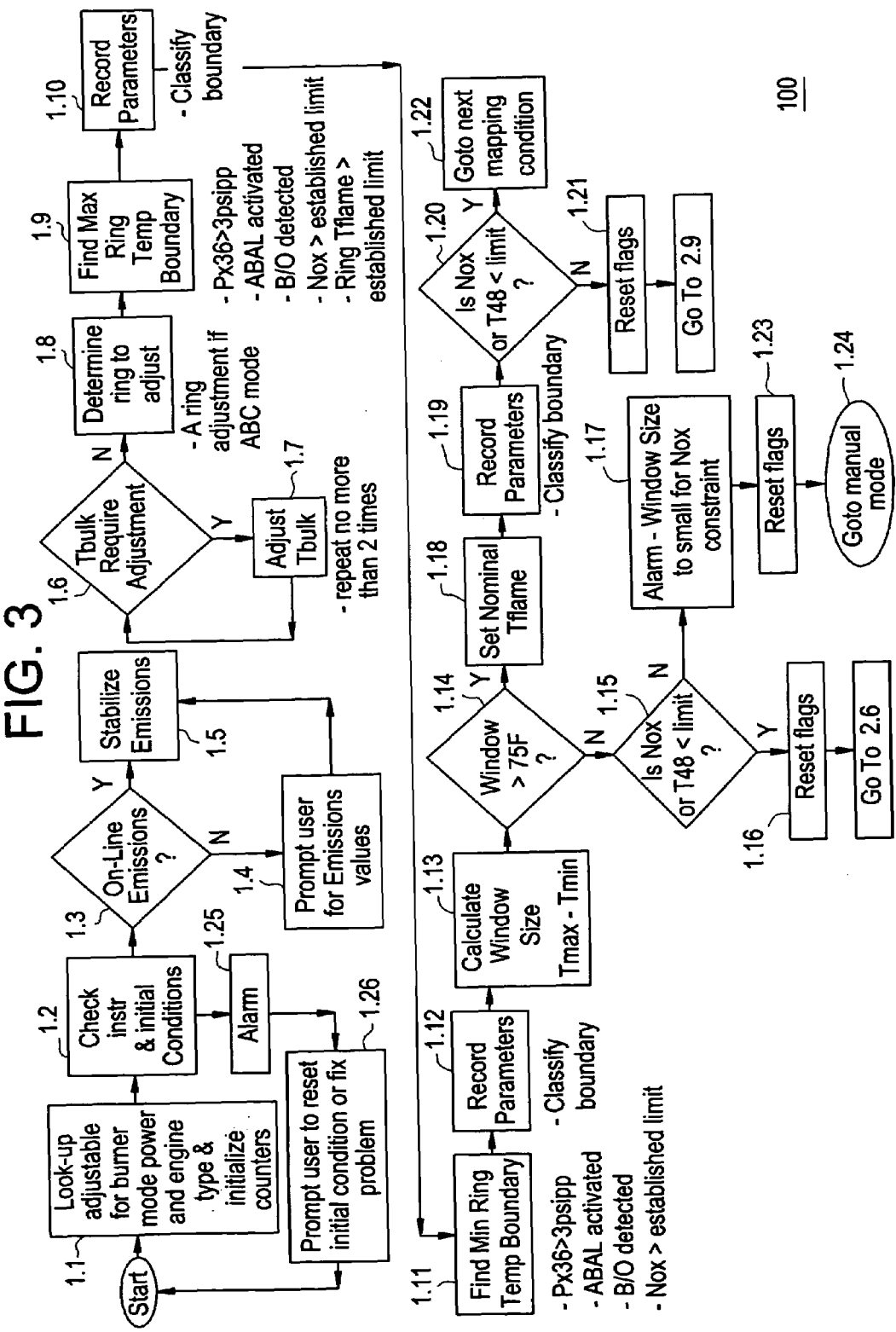
FIG. 3 is a flowchart depicting a method for automatic mapping of a combustor in a gas turbine engine system.

Referring to FIGS. 2 and 3, method 100 begins at block 1.1 where a lookup table in memory 82 is accessed by mapping device 13 to initialize parameters and counters for a particular burner mode, power level, and engine type. Method 100 then continues to block 1.2 wherein the instruments and initial conditions of the operating combustor 10 are checked to see that the combustor 10 is not malfunctioning. Instrumentation checks performed may include checks of pressure, temperature, acoustic, and emissions sensors 84-92, which may include engine temperature and pressure sensors, fuel flow sensors, fuel temperature, and fuel specific gravity. If these sensors are reading improperly, or the values provided by the sensors are outside a predetermined range for proper operability of the gas turbine, an alarm is activated (block 1.25) and the user is prompted with corrective steps to be taken before mapping can resume (block 1.26). Initial conditions to be checked include bleed levels, emissions levels, acoustic levels, ring flame temperatures, the dome temperatures, and blowout potential. If these values are outside a predetermined range for proper operability of the gas turbine, the user is prompted with corrective steps to be taken before mapping can resume.

If the initial conditions and instruments do not indicate an alarm condition in block 1.2, then method 100 continues to block 1.3. In block 1.3 it is determined whether or not predetermined emissions input is to be used. If predetermined (on-line) emissions is available, emissions data from a continuous emissions monitor is passed directly to the standard interface. If automatic emissions levels are not to be used, the user is prompted to input emissions values in block 1.4.

From block 1.3 or block 1.4, method 100 continues to block 1.5 where emissions levels from the combustor 10 are stabilized to either the predetermined emissions levels from block 1.3 or the user input values from block 1.4. As used herein, emissions levels have stabilized when the emissions levels have reached steady values over a predetermined time period. The method then continues to block 1.6 where a bulk combustor flame temperature (Tbulk) procedure is initiated. The bulk temperature procedure checks emissions levels, and high pressure turbine (HPT) outlet temperatures and combustor ring flame temperatures at various sensors 90 and 86 to determine if they are within the combustor's predetermined design limits. If these parameters are not within limits, then mapping device 13 provides a signal to controller 11 instructing controller 11 to increase or decrease bulk temperature as necessary. The bulk temperature procedure also limits the number of bulk temperature adjustments to a predetermined number of iterations (e.g., two times). The bulk temperature procedure is described in further detail hereinafter. If the bulk temperature requires adjustment, the bulk temperature is adjusted using a bulk temperature adjustment procedure in block 1.7, and the method returns to block 1.6. If bulk temperature does not require adjustment, the process continues to block 1.8.

At block 1.8, a dome 12, 14, or 16 to be adjusted is determined in block 1.1 using a procedure that selects the dome based on the mode and the type of combustor 10. A procedure for selecting the dome to be adjusted is described in further detail herein. Once the dome 12, 14, or 16 has been selected, method 100 continues to block 1.9 where the maximum ring flame temperature boundary is determined for the given burner mode and power level. The maximum ring flame temperature boundary is determined by a maximum temperature boundary procedure, which causes an increase in the temperature of the combustor flame and analyzes data from sensors 84-92 to detect changes in dynamic pressure, blowout indicators, ring flame temperature limits and emissions limits caused by this increase. The procedure then determines if the maximum ring flame temperature boundary has been reached based on data from the various sensors. The use of many parameters to detect the ring flame temperature boundary provides for a more reliable and repeatable boundary search. The maximum temperature boundary procedure will be described in further detail hereinafter.

Once the maximum ring flame temperature boundary is determined in block 1.9, the parameters (e.g., readings from sensors 84-92) for this boundary are recorded into memory device 82 at block 1.10. Method 100 then continues to block 1.11, where the minimum ring flame temperature boundary is determined using a minimum temperature boundary procedure. The minimum temperature boundary procedure causes a decrease in the ring flame temperature in the subject dome and analyzes data from sensors 84-92 to detect changes in dynamic pressure, blowout indicators, ring flame temperature limits, and emissions to determine if the minimum ring flame temperature boundary has been reached. Again, the use of many parameters to detect the ring flame temperature boundary provides for more reliable and repeatable boundary search. The minimum ring flame temperature boundary procedure will be described in further detail hereinafter.

Once the minimum ring flame temperature boundary is determined, the parameters (e.g., readings from sensors 84-92) for this boundary are recorded into memory device 82 at block 1.12. Method 100 then continues to block 1.13 where the minimum ring flame temperature, determined in block 1.11, is subtracted from the maximum ring flame temperature, determined in block 1.9, to determine a temperature window size. At block 1.14, the temperature window size calculated in block 1.13 is compared to a predetermined minimum window size (e.g., 75 degrees Fahrenheit), which is retrieved from memory device 82. If the temperature window size is less than the predetermined minimum window size, method 100 continues to block 1.15, where the NOx levels and combustor discharge temperatures, recorded in blocks 1.10 and 1.12, are compared against predetermined threshold limits retrieved from memory device 82. If the NOx levels or combustor discharge temperatures are above their threshold limits, an alarm prompts the user, at a block 1.17, that the temperature window size is too small for the NOx constraint. From block 1.17, the method continues to block 1.23, where all internal flags are reset, and then to block 1.24, where method 100 is ended. If NOx levels and combustor outlet pressures are below their predetermined threshold limits in block 1.15, the method continues to block 1.16, where all internal flags are reset, and then to block 2.6 where the bulk temperature will be increased.

Returning again to block 1.14, if the temperature window calculated in block 1.13 is greater than the predetermined threshold limit (e.g., 75 degrees Fahrenheit), the method continues to block 1.18 where a nominal ring flame temperature is calculated from the minimum and maximum ring flame temperatures determined in blocks 1.9 and 1.11. In addition, mapping device 13 instructs controller 11 to set the ring flame temperature of the operating combustor 12, 14, or 16 to this nominal temperature. The procedure to determine nominal ring flame temperature is described in further detail hereinafter.

Once nominal ring flame temperature is set in block 1.18, the method continues to block 1.19 where data from sensors 84-92 are recorded for operation of combustor 10 at nominal ring flame temperature. Method 100 then continues to block 1.20 where the NOx level and high pressure turbine outlet temperature recorded in block 1.19 are compared to their predetermined threshold limits. If the NOx level and high pressure turbine outlet temperature are above their predetermined threshold limits in block 1.20, then method 100 continues to block 1.20, where all internal flags are reset, and then to block 2.9, where the bulk temperature will be decreased. If, in block 1.20, the NOx level and combustor outlet temperature recorded in block 1.19 are below their predetermined threshold limits, method 100 continues to block 1.22 where the next mapping condition (burner mode, power level) is analyzed.

Figure 4:
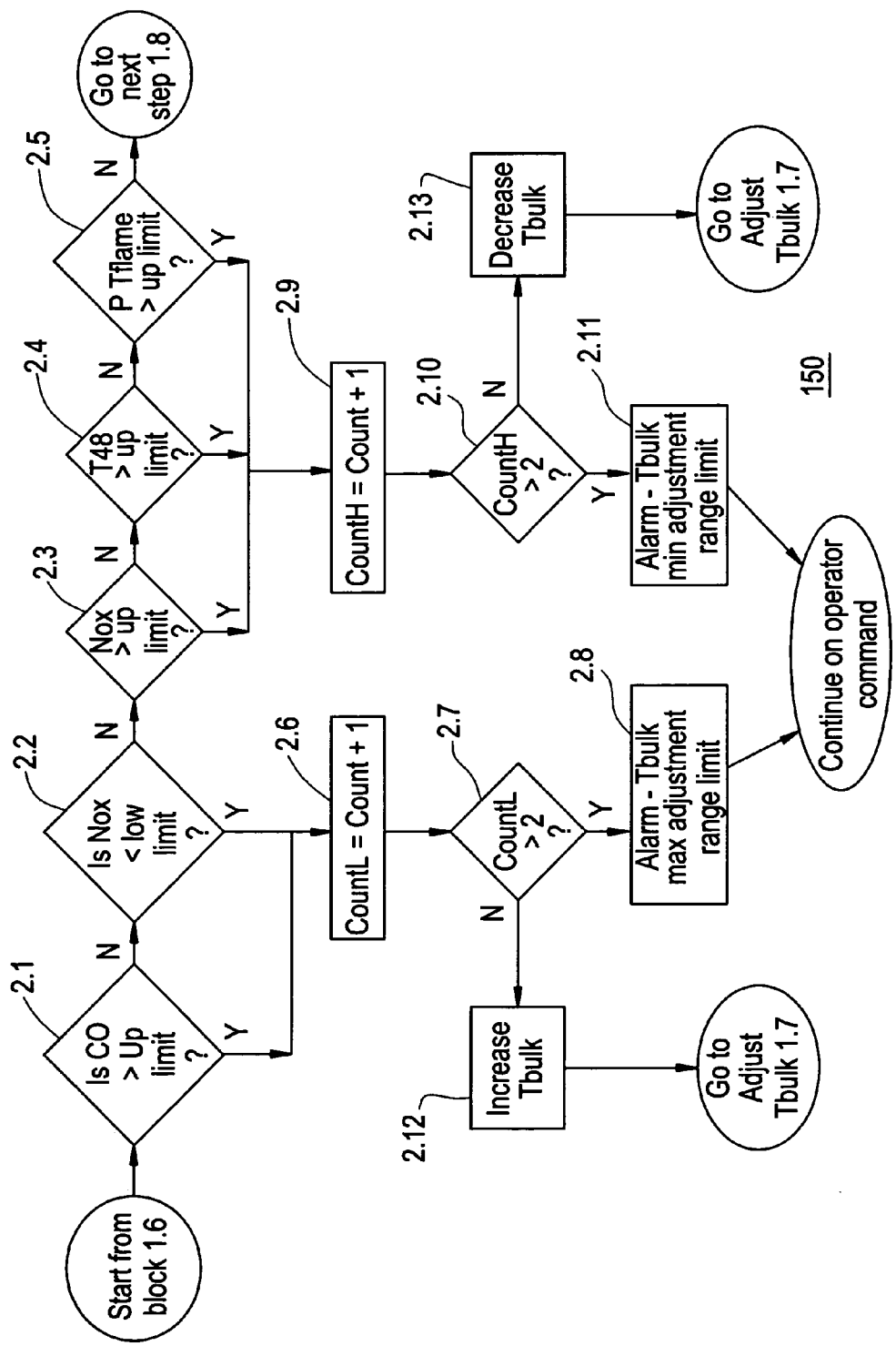
FIG. 4 is a flowchart depicting a procedure to determine if bulk combustor flame temperature requires adjustment, for use in block 1.6 of FIG. 3.

FIG. 4 is a flowchart depicting a procedure, generally shown at 150, to determine if bulk temperature requires adjustment, as may be applied in block 1.6 of FIG. 3. Procedure 150 starts in block 2.1 where readings from the combustor's carbon monoxide (CO) emissions levels are compared to a predetermined threshold limit retrieved from memory device 82. If CO readings are below the predetermined threshold limit, procedure 150 continues to block 2.2 where NOx emissions levels are compared with a predetermined NOx lower limit retrieved from memory device 82. If the NOx emissions levels are above the NOx lower limit, procedure 150 continues to block 2.3 where the NOx emissions levels are compared with a predetermined NOx upper limit retrieved from memory device 82. If the NOx emissions levels are below the NOx upper limit, procedure 150 continues to block 2.4 where high pressure turbine outlet temperature from sensor 87 is compared to a predetermined threshold limit retrieved from memory device 82. If high pressure turbine outlet temperature is below the predetermined threshold limit, the procedure continues to block 2.5 where the ring flame temperature from sensor 86 is compared to upper threshold limit retrieved from memory device 82. If ring flame temperature is below this upper threshold limit, procedure 150 is completed and method 100 continues at block 1.8 of FIG. 1.

Referring again to blocks 2.1 and 2.2, if CO is above its upper threshold limit or NOx is below its lower threshold limit, procedure 50 continues to block 2.6 where a counter is incremented by one. After the counter is incremented, the procedure continues to block 2.7 where the counter is compared to a predetermined maximum number of iterations (e.g., 2). If the counter is less than or equal to the maximum number of iterations, mapping device 13 instructs combustion controller 11 to increase bulk temperature in block 2.12 and method 100 continues at block 1.7 where bulk temperature is adjusted. If the counter is greater than the maximum number of iterations, procedure 150 continues to block 2.8 where an alarm notifies the user that bulk temperature has reached its maximum adjustment range limit. The user then restarts method 100 at block 1.1 of FIG. 1.

Referring again to blocks 2.3, 2.4, and 2.5, if NOx, levels, high pressure turbine outlet temperature, or ring flame temperature are above their maximum threshold limits, then a second counter is incremented at block 2.9. After the second counter is incremented, procedure 150 continues to block 2.10 where the second counter is compared to the predetermined maximum number of iterations (e.g., 2). If the second counter is less than or equal to the maximum number of iterations, mapping device 13 instructs combustion controller 11 to decrease bulk temperature at block 2.13 and process 100 continues at block 1.7 where bulk temperature is adjusted. If the second counter is greater than the maximum number of iterations, procedure 150 continues to block 2.11 where an alarm notifies the user that bulk temperature has reached its minimum adjustment range limit. The user then restarts method 100 at block 1.1 of FIG. 1.

Figure 5:
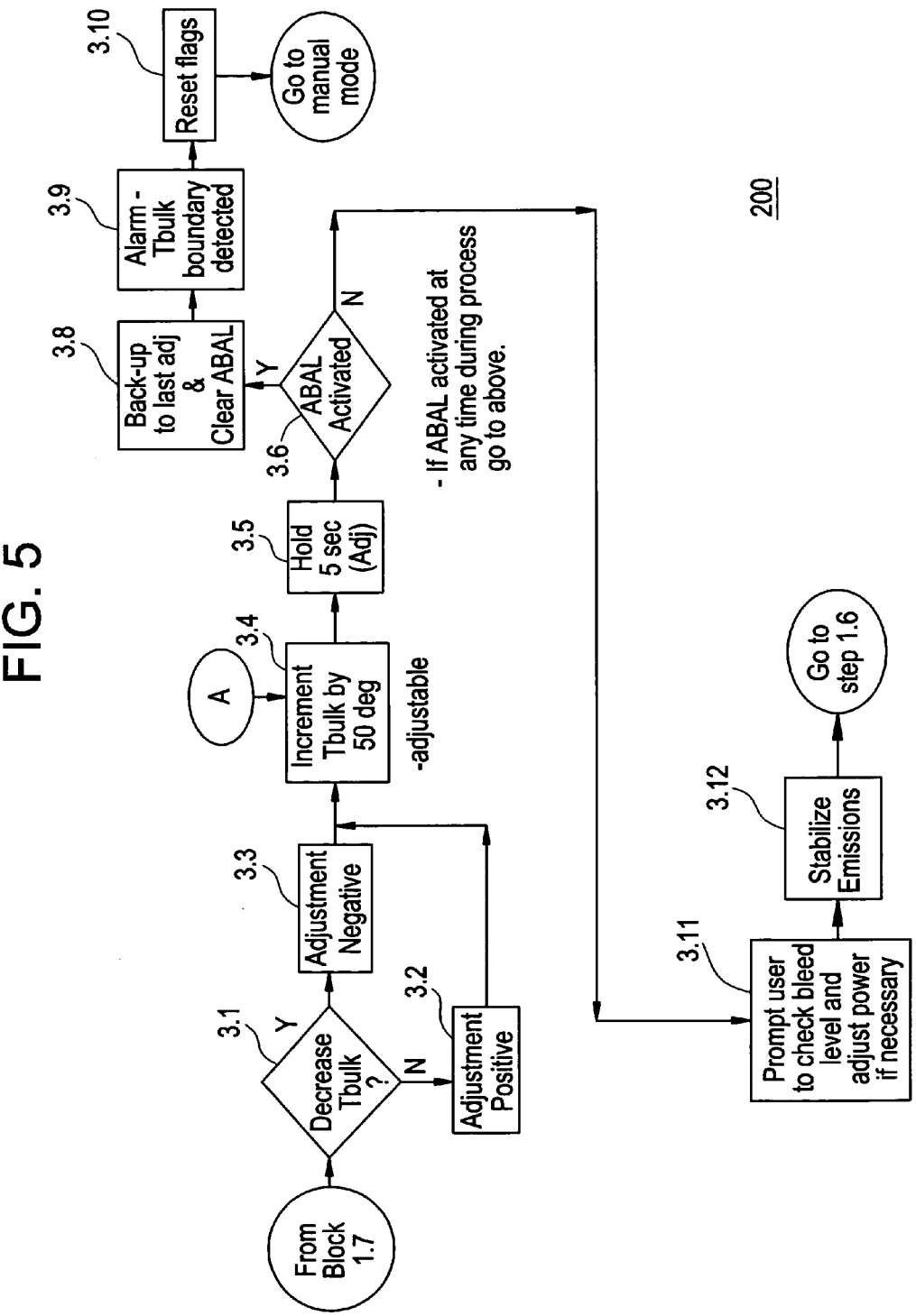
FIG. 5 is a flowchart depicting a procedure for adjusting bulk combustor flame temperature as used in block 1.7 of FIG. 3.

FIG. 5 is a flowchart depicting a procedure, generally shown at 200, for adjusting bulk temperature as used in block 1.7 of FIG. 1. After starting, procedure 200 queries whether bulk temperature is to be increased or decreased in block 3.1, as determined in blocks 2.12 and 2.13 of procedure 150 (FIG. 4). After either block 3.2 or 3.3, procedure 150 continues to block 3.4 where mapping device 13 instructs controller 11 either to increment or decrement bulk temperature by a predetermined number of degrees. From block 3.4 the procedure continues to block 3.5 where procedure 200 is delayed a predetermined period of time (e.g. 5 seconds) to give the combustor 10 time to adjust to the temperature change made in block 3.4. After the combustor 10 has adjusted, procedure 200 continues to block 3.6 where it is determined whether or not acoustics and blow out avoidance logic in the controller 11 has been activated in response to the temperature change made in block 3.4.

The acoustics and blow out avoidance logic in controller 11 continuously monitors dynamic pressures within the combustor 10. If the monitored dynamic pressures exceed set limits, the acoustics and blow out avoidance system takes action to alter ring flame temperatures to reduce dynamic pressures. The acoustics and blow out avoidance logic within controller 11 can also detect incipient lean blowouts by comparing measured and calculated fuel flows for the operating conditions. Activation of the acoustics and blow out avoidance logic indicates that a ring flame temperature has caused the combustor to operate near an operational boundary. Procedure 200 can, therefore, use the acoustics and blow out avoidance logic to establish ring flame temperature limits when setting bulk temperature. In engines commercially available from General Electric, the acoustics and blow out avoidance logic is known as the Acoustics and Blowout Avoidance Logic (ABAL).

Referring again to block 3.6, if the acoustics and blow out avoidance logic is activated, indicating that the last temperature change has caused the bulk flame temperature to reach an operational boundary, then the data from sensors 84-92 for the last temperature adjustment are recorded in memory device 82 as parameters for the bulk temperature boundary. From block 3.7 procedure 200 continues to block 3.8 where an alarm notifies the user that a bulk temperature boundary has been detected, and to block 3.9 where internal flags are reset. From block 3.9, method 100 is terminated and combustor mapping is ceased.

Referring again to block 3.6, if it is determined that the acoustics and blow out avoidance logic in controller 11 (e.g., ABAL) is not activated, the user is then prompted to check bleed levels and adjust power if necessary at block 3.11. From block 3.11, procedure 200 continues to block 3.12 where emissions levels from the gas turbine are stabilized after emissions have been stabilized, method 100 continues at step 1.6 where it is determined whether or not bulk temperature requires adjustment.

Figure 6:
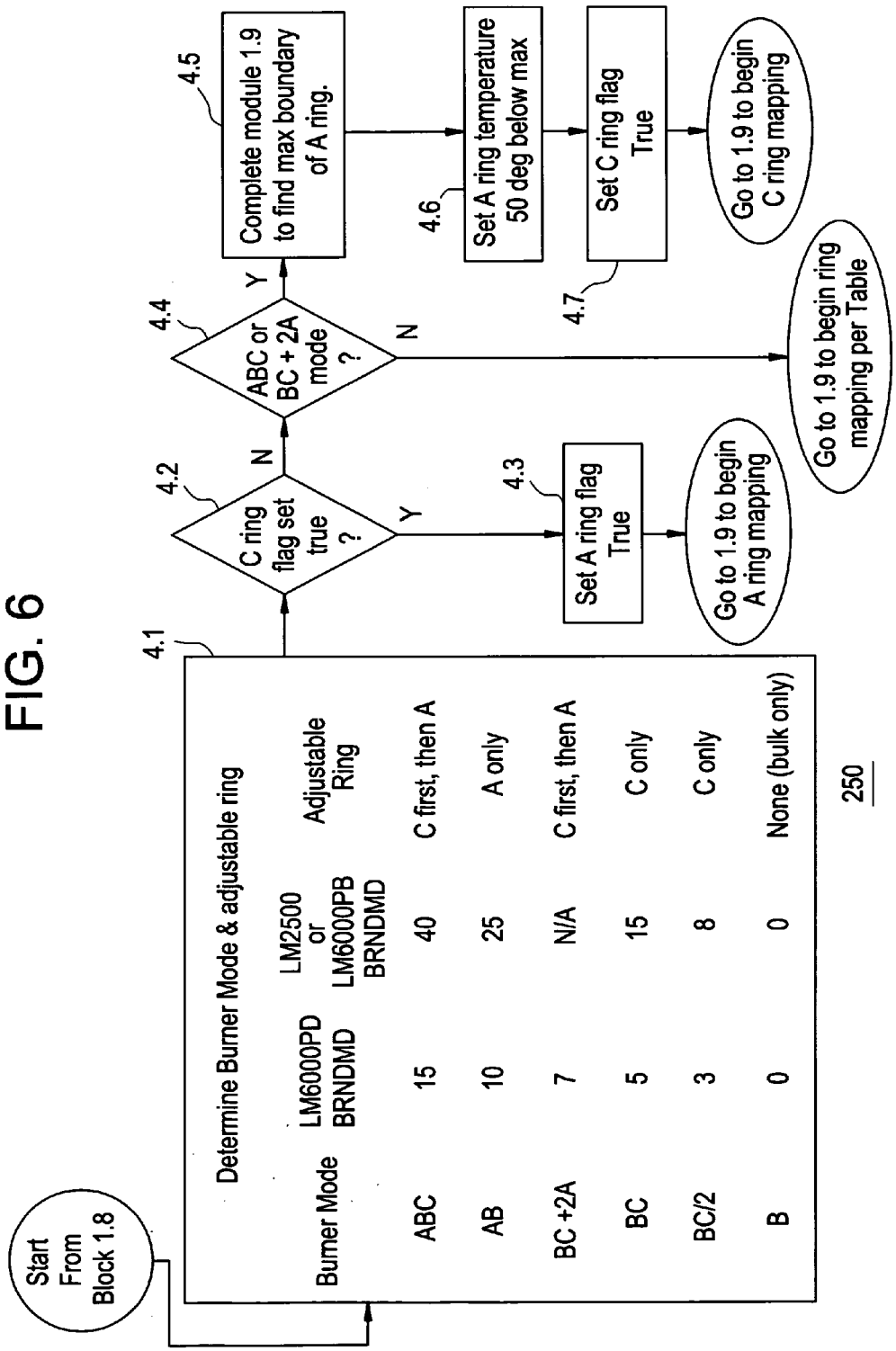
FIG. 6 is a flowchart depicting a procedure to determine which dome is to be adjusted, as implemented in block 1.8 of FIG. 3.

FIG. 6 is a flowchart depicting the procedure, generally shown at 250, to determine which dome is to be adjusted, as implemented in block 1.8 of method 100. After starting procedure 250, a lookup table is used by mapping device 13 in block 4.1 to determine the appropriate dome(s) to be adjusted based on the current burner mode and engine type. In the lookup table of FIG. 6, ring (dome) B represents the only dome in operation during engine idle and the dome that is used in setting bulk temperature. Typically, ring B is the middle dome 14. Ring C represents the dome that is in operation during mid-range loads. Typically, ring C is the inner dome 12. Ring A represents the dome that is in operation for the highest operating loads. Typically, Ring A is the outer dome 16. Thus, for example, the burner modes shown in the lookup table of block 4.1 range from idle (mode B) to full power (mode ABC). Procedure 250 ensures that all domes in-use for a particular operating mode are mapped, and that the burners are mapped in the proper sequence.

In block 4.1, values in the lookup table are used to set flags in memory device 82. Once these flags are set, procedure 250 continues to block 4.2 where it is determined whether or not the C ring flag is set to true. If, at block 4.2, the C ring flag is set to false, procedure 250 continues to block 4.4, where it is determined whether flag for the ABC or BC+2A modes are set to true. If, in block 4.4, the flag for either the ABC or BC+2A modes are set to true, procedure 250 continues at block 4.5. In block 4.5, procedure 100 of FIG. 1 continues at block 1.9 where the maximum ring flame temperature boundary is determined for the A ring. After the maximum temperature boundary is determined for the A ring, procedure 250 continues to block 4.6 where the A ring flame temperature in the operating combustor is reduced by a predetermined number of degrees below its maximum boundary temperature (e.g. 50 degrees Fahrenheit). From block 4.6, procedure 250 continues to block 4.7, where the C ring flag is set to true, and then to block 1.9 of method 100, where mapping of the C ring is performed.

Returning to block 4.2, if the C ring flag is set to true, the procedure continues to block 4.3 where the A ring flag is set to true, and then to block 1.9 of method 100 where the mapping of the A ring begins. Returning to block 4.4, if the flag for either the ABC or BC+2A modes are set to false, procedure 250 ends and method 100 continues at block 1.9 where mapping of the ring is performed in the sequence indicated in the lookup table of block 4.1. ring flame temperaturering flame temperature.

Figure 7:
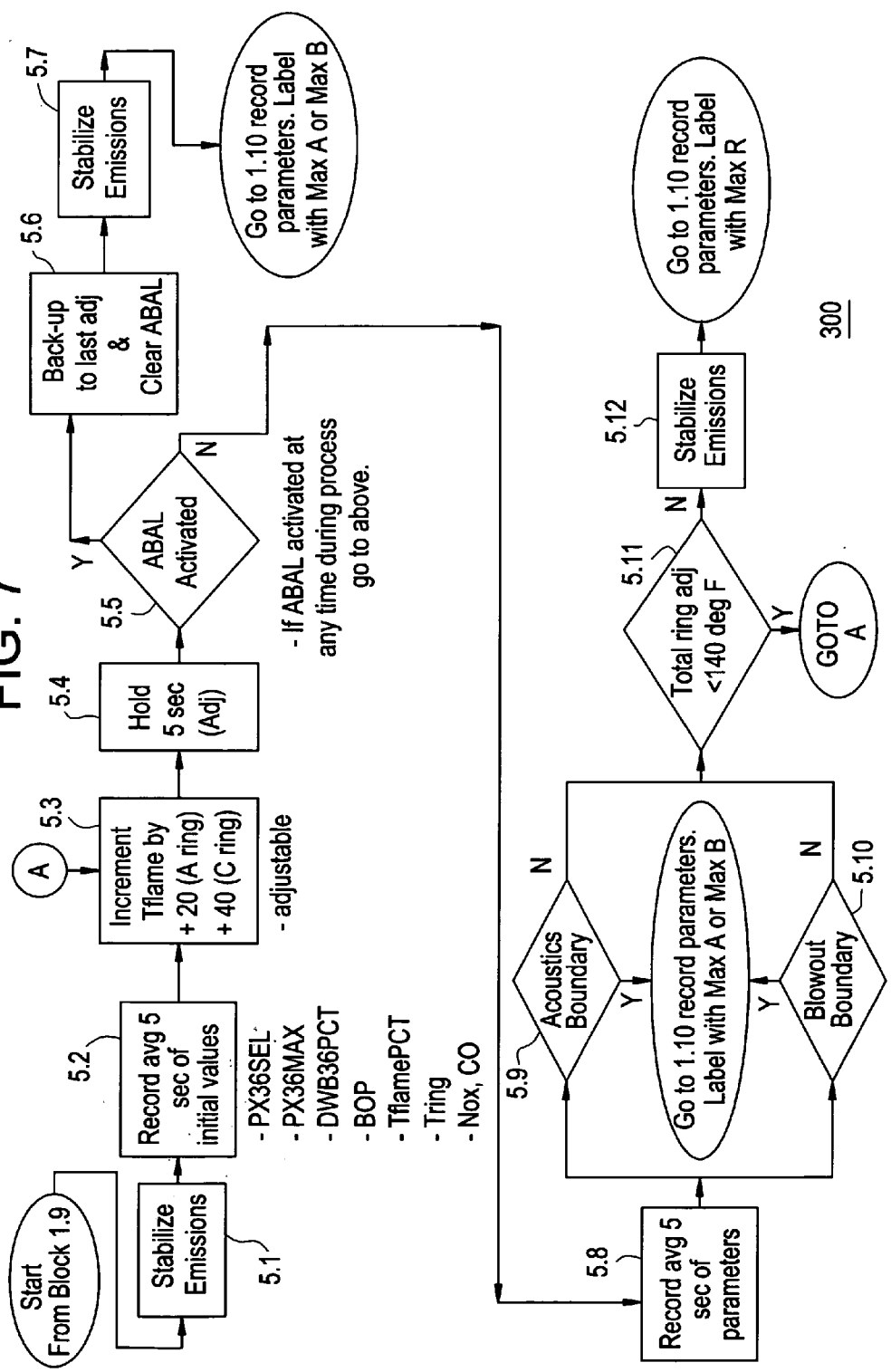
FIG. 7 is a flow chart depicting a procedure to determine the maximum ring temperature boundary for a given operating mode and bleed level, as is used in block 1.9 of FIG. 3.

FIG. 7 is a flow chart for a procedure, generally shown as 300, to determine the maximum ring temperature boundary for a given operating mode and bleed level, as is used in block 1.9 of method 100. After starting, emissions are stabilized in block 5.1. After emissions have been stabilized, a number of parameters are recorded using sensors 84-92 within the combustor 10 and an average of each parameter is determined in block 5.2. For example, the average of each parameter might be determined from sensor readings taken over a five second interval. The plurality of operational parameters may include ring flame temperature, various emissions levels (e.g. NOx and CO), bleed level and dynamic pressure level.

After the average of each parameter is determined in block 5.2, mapping device 13 instructs combustion controller 11 to increase the ring flame temperatures in the dome (ring) being mapped by a predetermined number of degrees in block 5.3. For example, the A ring flame temperature may be increased by 20 degrees Fahrenheit while the C ring flame temperature may be increased by 40 degrees Fahrenheit. After the ring flame temperatures are incremented in block 5.3, procedure 300 is delayed a predetermined amount of time (e.g., 5 seconds) in block 5.4 to allow the combustor sensor readings to stabilize. The procedure then continues to block 5.5, where it is determined whether or not the acoustics and blow out avoidance logic (e.g. ABAL) in the controller 11 has been activated in response to the increase in ring flame temperature made in block 5.3. If the acoustics and blow out avoidance logic has been activated, then the last adjustment to the ring flame temperature (i.e. the ring flame temperature increases made in block 5.3) are negated in block 5.6, and ring flame temperature is allowed to return to the temperature before block 5.3. Emissions are then allowed to stabilize in block 5.7, and procedure 300 continues to block 1.10 of method 100 where current parameters (the average values calculated in block 5.2) are stored in memory device 82 as maximum temperature values and a MAX ACOUSTIC or MAX BLOWOUT flag is set to true, depending on which limit was reached in the acoustics and blow out avoidance logic.

Referring again to block 5.5, if the acoustics and blow out avoidance logic has not been activated, then procedure 300 continues to block 5.8 where a number of parameters are recorded using the same plurality of sensors as used in block 5.2, and averages of these parameters are determined. For example, the average of each parameter might be determined from sensor readings taken over a five second interval. The average values are then compared to acoustics boundary levels (block 5.9) and blowout boundary levels (block 5.10). If the average values exceed either the blowout or acoustic boundaries, then the procedure continues to block 1.10 of method where current parameters (the average parameters from block 5.8) are stored in memory device 82 as maximum temperature values and a MAX ACOUSTIC or MAX BLOWOUT flag is set to true, depending on which limit was reached in block 5.9 or 5.10.

If, in blocks 5.9 and 5.10, the average values are less than both the acoustic and the blowout boundary values, then procedure 300 continues to block 5.11. In block 5.11, it is determined whether or not the total increase in ring flame temperature in block 5.3 is less than a predetermined value (e.g. 140 degrees Farenheit) retrieved from memory device 82. The ring flame temperature increase is determined by subtracting the average ring flame temperature value determined in block 5.2 from the average ring flame temperature value determined in block 5.8. If the increase in ring flame temperature is less than the predetermined temperature difference, procedure 300 returns to block 5.3 where the ring flame temperature is increased again by the predetermined amount. If the total increase in ring flame temperature is greater than or equal to the predetermined temperature difference, the procedure continues to block 5.12. In block 5.12, the emissions values are stabilized, after which the procedure 300 ends and method 100 continues at block 1.10 where the current parameters for the maximum temperature boundary (the average values calculated in block 5.8) are recorded in memory device 82 and a MAX RANGE flag is set to true.

Figure 8:
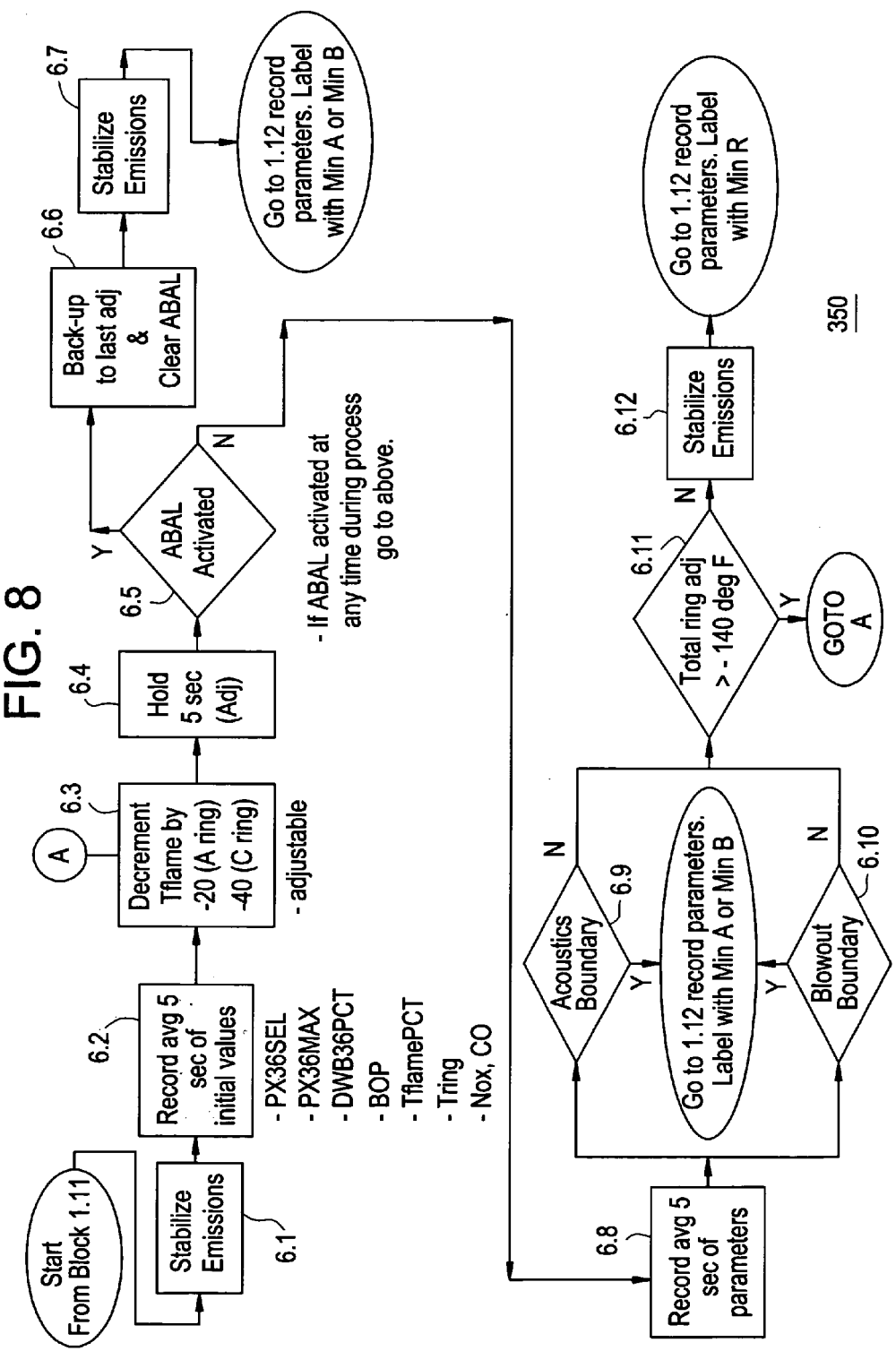
FIG. 8 is a flow chart for a procedure to determine the minimum ring temperature boundary for a given operating mode and bleed level, as is used in block 1.11 of FIG. 3.

FIG. 8 is a flow chart for a procedure, generally shown as 350, to determine the minimum ring temperature boundary for a given operating mode and bleed level, as is used in block 1.11 of method. The minimum temperature boundary is determined in a manner similar to that used to determine the maximum temperature boundary in FIG. 7. After starting, emissions are stabilized in block 6.1. After emissions have been stabilized, a number of control system parameters are recorded and an average of each parameter is determined in block 6.2. For example, each average might be determined from parameter readings taken over a five second interval. The plurality of control system parameters may include ring flame temperature, and various emissions levels (e.g., NOx and CO), bleed level and dynamic pressure level.

After the average of each parameter is determined in block 6.2, the ring flame temperature for the dome being mapped is decremented by a predetermined number of degrees in block 6.3. For example, the A ring may be decreased by 20 degrees Fahrenheit while the C ring may be decreased by 40 degrees Fahrenheit. After the ring flame temperature is decremented in block 6.3, procedure 350 is delayed a predetermined amount of time (e.g., 5 seconds) in block 6.4 to allow the control system parameters to stabilize. Procedure 350 then continues to block 6.5, where it is determined whether or not the acoustics and blow out avoidance logic (e.g. ABAL) in the controller 11 has been activated in response to the decrease in ring flame temperature made in block 6.3. If the acoustics and blow out avoidance logic has been activated, then the last adjustments to the ring flame temperatures (i.e. the ring flame temperature decreases made in block 6.3) are negated in block 6.6, and ring flame temperature is allowed to return to the temperature before block 6.3. Emissions are then allowed to stabilize in block 6.7, and procedure 350 continues to block 1.12 of method 100 where the current parameters (the average values calculated in block 6.2) are stored in memory device 82 as minimum temperature values and a MIN ACOUSTIC or MIN BLOWOUT flag is set to true, depending on which limit was reached in the acoustics and blow out avoidance logic.

Referring again to block 6.5, if the acoustics and blow out avoidance logic has not been activated, then procedure 350 continues to block 6.8 where a number of parameters are recorded using the same plurality of sensors 84-92 as used in block 6.2, and averages of these parameters are determined. For example, each average might be determined from sensor readings taken over a five second interval. The average values are then compared to predetermined acoustics boundary levels (block 6.9) and predetermined blowout boundary levels (block 6.10) retrieved from memory device 82. If the average values exceed either the blowout or acoustic boundaries, then the procedure continues to block 1.12 of method 100 where the current parameters (the average parameters from block 6.8) are stored in memory device 82 as minimum temperature values and a MIN ACOUSTIC or MIN BLOWOUT flag is set to true, depending on which limit was reached in block 6.9 or 6.10.

If, in blocks 6.9 and 6.10, the average values are less than both the predetermined acoustic and the blowout boundary values, then procedure 350 continues to block 6.11. In block 6.11, it is determined whether or not the decrease in ring flame temperatures in response to the decrease in ring flame temperatures made in block 6.3 is greater than a predetermined temperature difference (e.g. −140 degrees Farenheit) retrieved from memory device 82. The ring flame temperature decrease is determined by subtracting the average ring flame temperature value determined in block 6.2 from the average ring flame temperature value determined in block 6.8. If the decrease in ring flame temperature is less than the predetermined temperature difference, procedure 350 returns to block 6.3 where the ring flame temperature is decreased again. If the total decrease in ring flame temperature is greater than or equal to the predetermined temperature difference, the procedure continues to block 6.12. In block 6.12, the emissions values are stabilized, after which procedure 350 ends and method 100 continues at block 1.12 where the current parameters for the minimum temperature boundary (the average values calculated in block 6.8) are recorded and a MIN RANGE flag is set to true.

Figure 9:
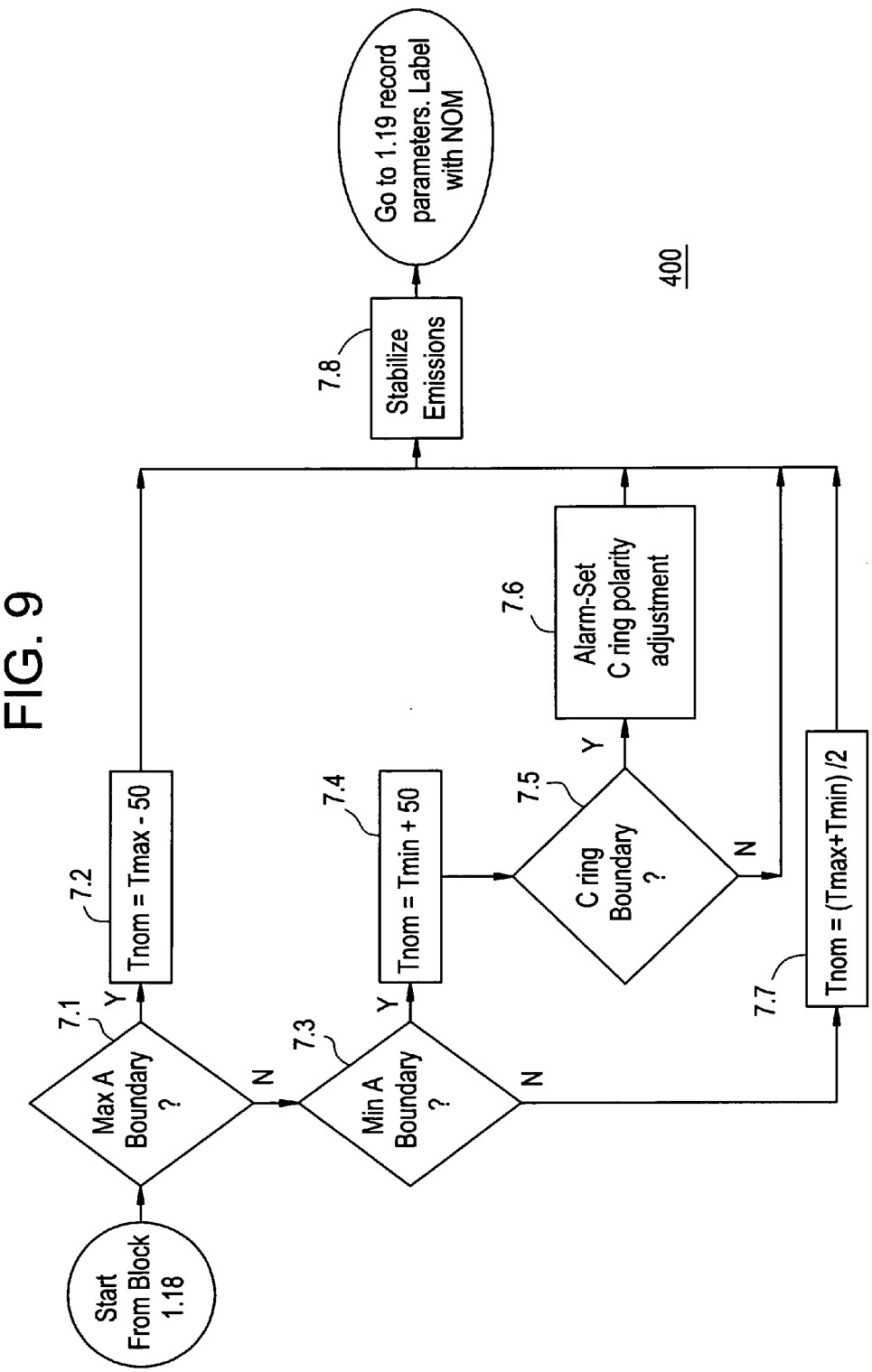
FIG. 9 is a flowchart depicting a procedure for setting nominal ring flame temperature once the new maximum and minimum temperatures have been established, as used in block 1.18 of FIG. 3.

FIG. 9 is a flowchart depicting the procedure, generally shown as 400, for setting nominal ring flame temperature after the new maximum and minimum temperatures boundaries have been established, as used in block 1.18 of method 100. In block 7.1, it is first determined whether or not a MAX ACOUSTIC flag has been set to true in maximum temperature boundary procedure 300 of FIG. 7. If the MAX ACOUSTIC flag has been set to true, then nominal ring flame temperature is calculated in block 7.2 by subtracting a predetermined temperature (e.g. 50 degrees Fahrenheit) from the maximum temperature boundary recorded in block 1.10 of method 100. If the MAX ACOUSTIC flag has not been set to true, then the procedure continues at block 7.3 where it is determined whether the MIN ACOUSTIC flag has been set to true in the minimum temperature boundary procedure 350 of FIG. 8. If the MIN ACOUSTIC flag has been set to true, then nominal ring flame temperature is calculated in block 7.4 by adding a predetermined temperature (e.g. 50 degrees Fahrenheit) to the minimum temperature boundary recorded in block 1.12 of method 100. If the C ring is the subject of the current mapping, as determined in block 7.5 from flags set in method 250 of FIG. 6, then the user is presented with an alarm to set the C ring polarity adjustment in block 7.6.

If, in block 7.3, the MIN ACOUSTIC flag has not been set to true, then procedure 400 continues at block 7.7 where the nominal ring flame temperature is calculated as the average of the maximum and minimum ring flame temperatures recorded in blocks 1.10 and 1.12, respectively, of method 100. After blocks 7.2, 7.5, 7.6, or 7.7, procedure 400 continues at block 7.8 where emissions are stabilized, and then to block 1.19 of method 100 where the maximum ring flame temperature calculated in blocks 7.2, 7.4, or 7.6 is recorded into memory device 82.

Figure 10:
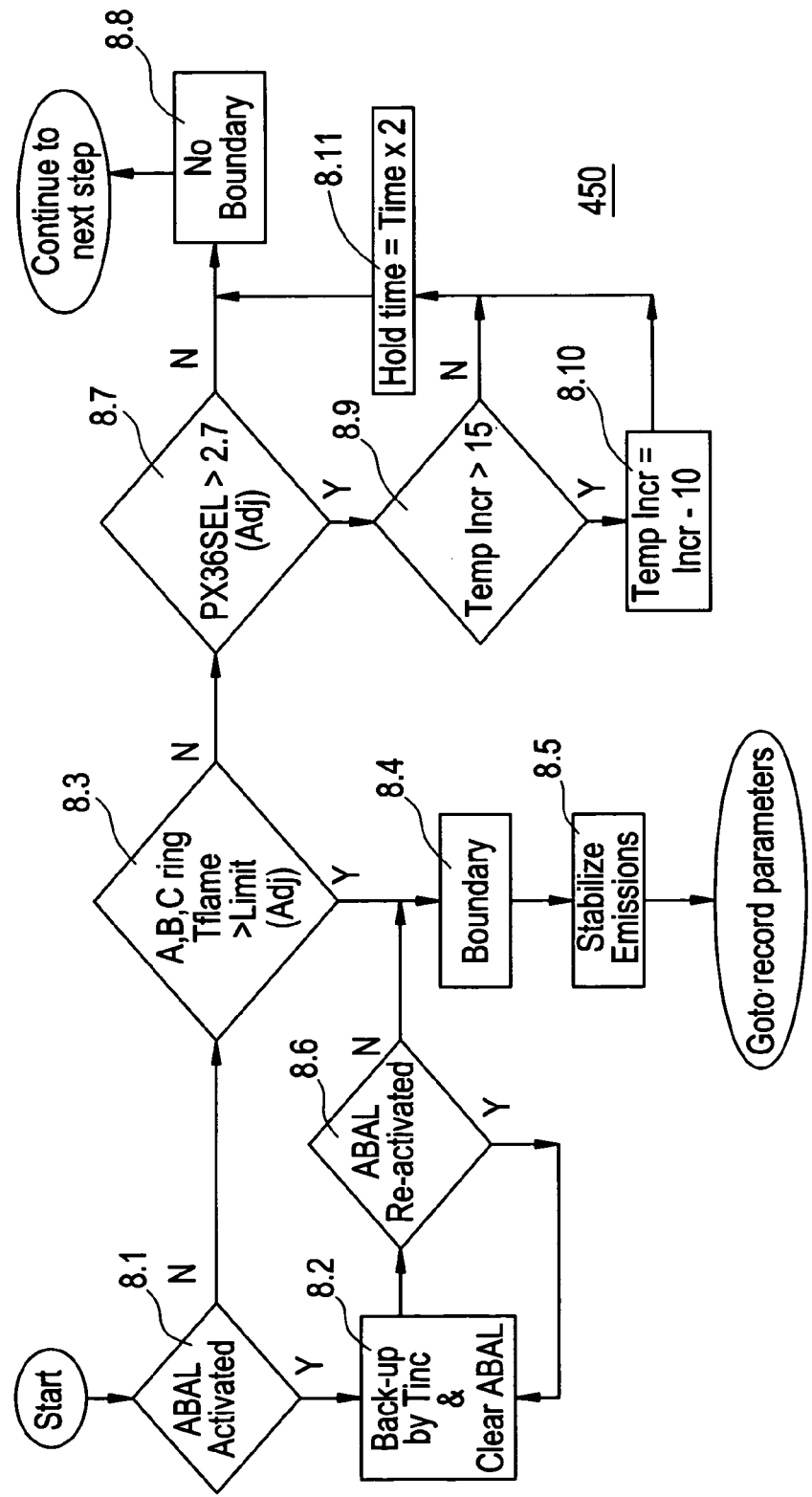
FIG. 10 is a flow chart depicting a procedure to determine an acoustic boundary, as may be used in block 5.9 of FIG. 7, or in block 6.9 of FIG. 8.

FIG. 10 is a flow chart for a procedure, generally shown as 450, to determine an acoustic boundary, as may be used in block 5.9 in maximum temperature boundary procedure 300 of FIG. 7, or in block 6.9 in minimum temperature boundary procedure 350 of FIG. 8. After starting, it is determined in block 8.1 whether or not the acoustics and blow out avoidance logic (e.g. ABAL) in the controller 11 has been activated. If the ABAL has not been activated, procedure 450 continues to block 8.3 where it is determined whether or not the ring flame temperature is above a predetermined threshold limit retrieved from memory device 82. The ring flame temperature is taken from the average value calculated in block 5.8 of procedure 300 or block 6.8 of procedure 350. If the ring flame temperature is above the predetermined threshold limit, then an acoustic boundary has been found (block 8.4) and procedure 450 continues to block 8.5 where emissions are stabilized and then to block 1.10 or block 1.12 of method 100 where the average values calculated in block 5.8 of procedure 300 or block 6.8 of procedure 350 are recorded in memory device 82 as the acoustic boundary conditions.

If, in block 8.3, the ring flame temperature is less than or equal to the predetermined threshold limit, then procedure 450 continues to block 8.7. In block 8.7, the dynamic pressure at the exit of the combustor is compared to a predetermined value. If the dynamic pressure is less than the predetermined value used in block 8.7 then no boundary has been found (block 8.8) and the maximum or minimum temperature boundary procedure 300, 350 continues at block 5.11 or 6.11.

If, in block 8.7, the dynamic pressure at the combustor outlet is less than or equal to the predetermined value, then procedure 450 continues to block 8.9. If, in block 8.9, the ring flame temperature increment or decrement from either block 5.3 of maximum temperature boundary procedure 300 or block 6.3 of minimum temperature boundary procedure 350 are greater than a predetermined number of degrees (e.g. 15 degrees Fahrenheit) then procedure 450 continues to block 8.10. In block 8.10, the ring flame temperature increment/decrement is reduced/increased by a predetermined number of degrees less than/greater than the predetermined number of degrees in block 8.9 (e.g., +/−10 degrees Fahrenheit). From either block 8.9 or 8.10, procedure 450 continues to block 8.11 where the procedure hold time, used in block 5.4 and 6.4 is delayed to allow combustor parameters to settle for a longer time. If procedure 450 reaches block 8.11, no boundary has been found (block 8.8) and the procedures 300 or 350 continue at block 5.3 or 6.3.

If, in block 8.1, the ABAL has been activated, the ring flame temperature is reduced by a predetermined amount in block 8.2, and the ABAL is cleared. If the ABAL is again activated in block 8.6, then the ring flame temperature is further reduced by the predetermined amount in block 8.2. The loop between blocks 8.2 and 8.6 continues until the ABAL remains inactive in block 8.6, which indicates that an acoustic boundary has been found (block 8.4). From block 8.4, procedure 450 continues to block 8.5 where emissions are stabilized, and then to block 1.10 or block 1.12 of method 100.

Figure 11:
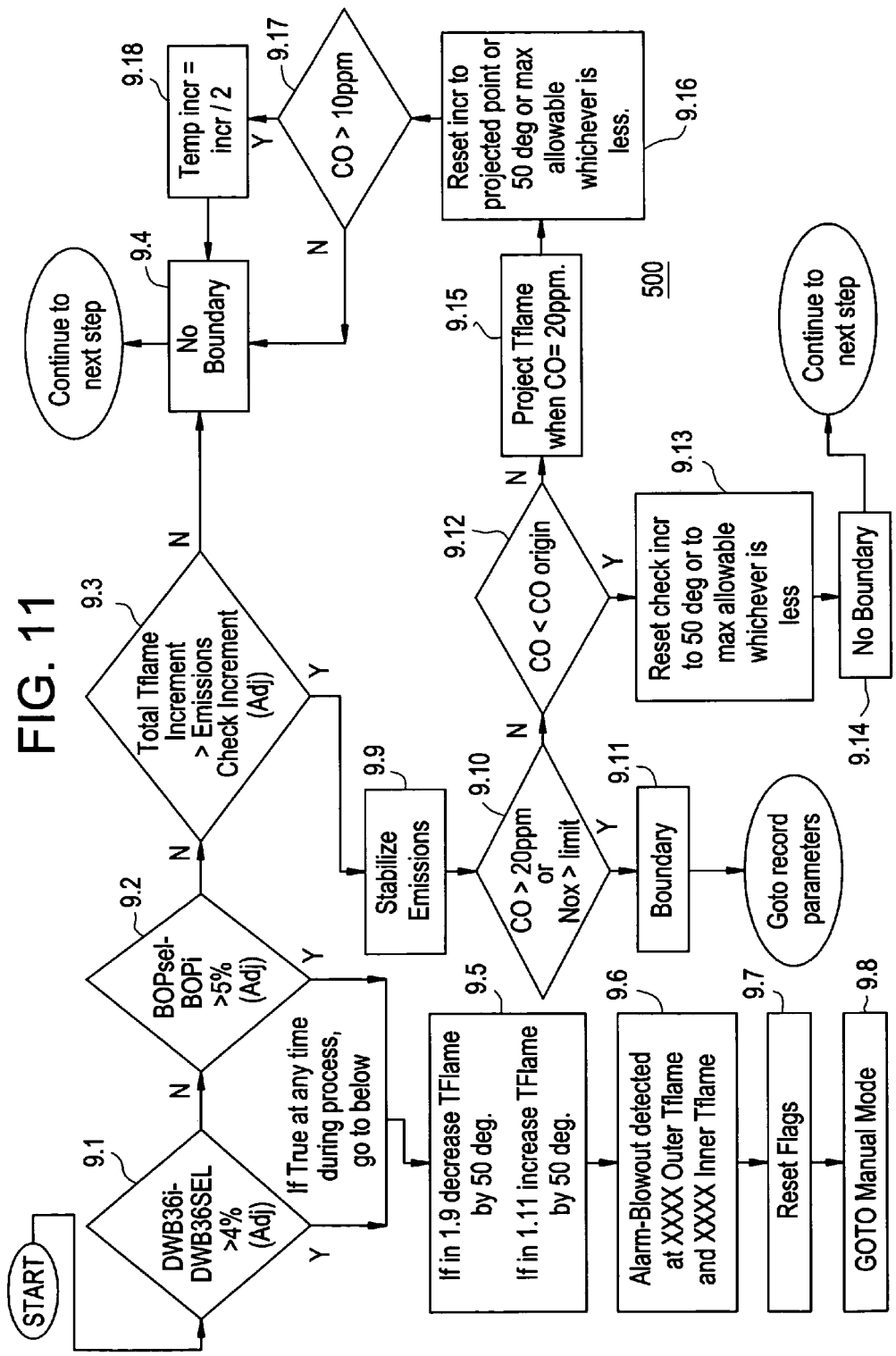
FIG. 11 is a flow chart depicting a procedure to determine a blowout boundary, as may be used in block 5.10 of FIG. 7, or in block 6.10 of FIG. 8.

FIG. 11 is a flow chart depicting a procedure 500 to determine a blowout boundary, as may be used in block 5.10 of procedure 300, or in block 6.10 of procedure 350. Procedure 500 begins at block 9.1 where it is determined whether or not the difference between the engine bleed level before adjustment, recorded in block 1.2, and the current bleed level is greater than some predetermined amount. This predetermined amount may be a percentage of the initial bleed level recorded in block 1.2. If the difference is less than or equal to the predetermined amount, it is then determined whether or not the difference between a current blowout parameter and an initial blowout parameter is greater than some predetermined amount. The blowout parameters indicate the quantity of fuel flow in excess of that which is predicted for a given mode. The blowout parameters are determined using any known thermodynamic heat load modeling method. The current blowout parameter is determined by inputting into the heat load model the engine speed, operating pressures, and temperatures presently existing in the engine being tested. The initial blowout parameter is determined by inputting into the heat load model the engine speed, operating pressures, and temperatures previously recorded in block 1.2. If, in either block 9.1 or 9.2, the differences are greater than their respective predetermined amount, procedure 500 continues at block 9.5. At block 9.5, the ring flame temperature is decreased by a predetermined amount (if the maximum ring flame temperature boundary is being determined in block 1.9 of method 100), or the ring flame temperature is increased by a predetermined amount (if the minimum ring flame temperature boundary is being determined in block 1.11 of method 100). An alarm indicating that a blowout has been detected is activated at block 9.6, all flags are reset at block 9.7, and method 100 ends at block 9.8.

If, in blocks 9.1 and 9.2, the differences are less than or equal to their respective predetermined amount, procedure 500 continues at block 9.3 where the total ring flame temperature increment, is compared to a predetermined emissions check temperature change. If the total ring flame temperature increment (or the decrement) is less than the emissions check temperature change, then no blowout boundary is detected, and the maximum or minimum temperature boundary procedure 300, 350 continues at block 5.11 or 6.11.

If, in block 9.3, the ring flame temperature increment (or decrement) is greater than the emissions check temperature change, then procedure 500 continues at block 9.9, where emissions are allowed to stabilize, and block 9.10 where the where readings from the combustor's CO and NOx emissions levels and are compared to predetermined limits retrieved from memory device 82. These predetermined limits may be the maximum emissions limits for the engine design. If CO or NOx readings are above their predetermined limits, then a blowout boundary has been detected (block 9.11) and method 100 continues at block 1.10 or block 1.12 where the average values calculated in block 5.8 of procedure 300 or block 6.8 of procedure 350 are recorded in memory device 82 as the blowout boundary conditions.

If, in block 9.10, CO or NOx readings are less than or equal to their predetermined limits, then procedure 500 continues at block 9.12 where the current CO reading is compared to the initial CO reading from block 1.2 of method 100. If the current CO reading is less than the initial reading, then procedure 500 continues to block 9.13. In block 9.13, the emissions check temperature change (used in block 9.3) is reset to either a predetermined higher temperature than that used previously in block 9.3 (e.g., it is reset to 50 degrees Farenheit), or to the maximum allowable temperature change for the engine, whichever is less. No blowout boundary has been detected (block 9.14), and the maximum or minimum temperature boundary procedure 300, 350 continues at block 5.11 or 6.11.

If, in block 9.12, the current CO reading is greater than or equal to the original CO reading from block 1.2 of method 100, then procedure 500 continues to block 9.15. In block 9.15, a flame temperature corresponding to the maximum CO limit (previously used in block 9.10) is projected using an extrapolation of data already obtained. In block 9.16 the lesser of the projected flame temperature from block 9.15 and the maximum allowable temperature change for the engine is used as the temperature increment in block 5.3 of method 300 or block 6.3 of method 350.

Figure 12:
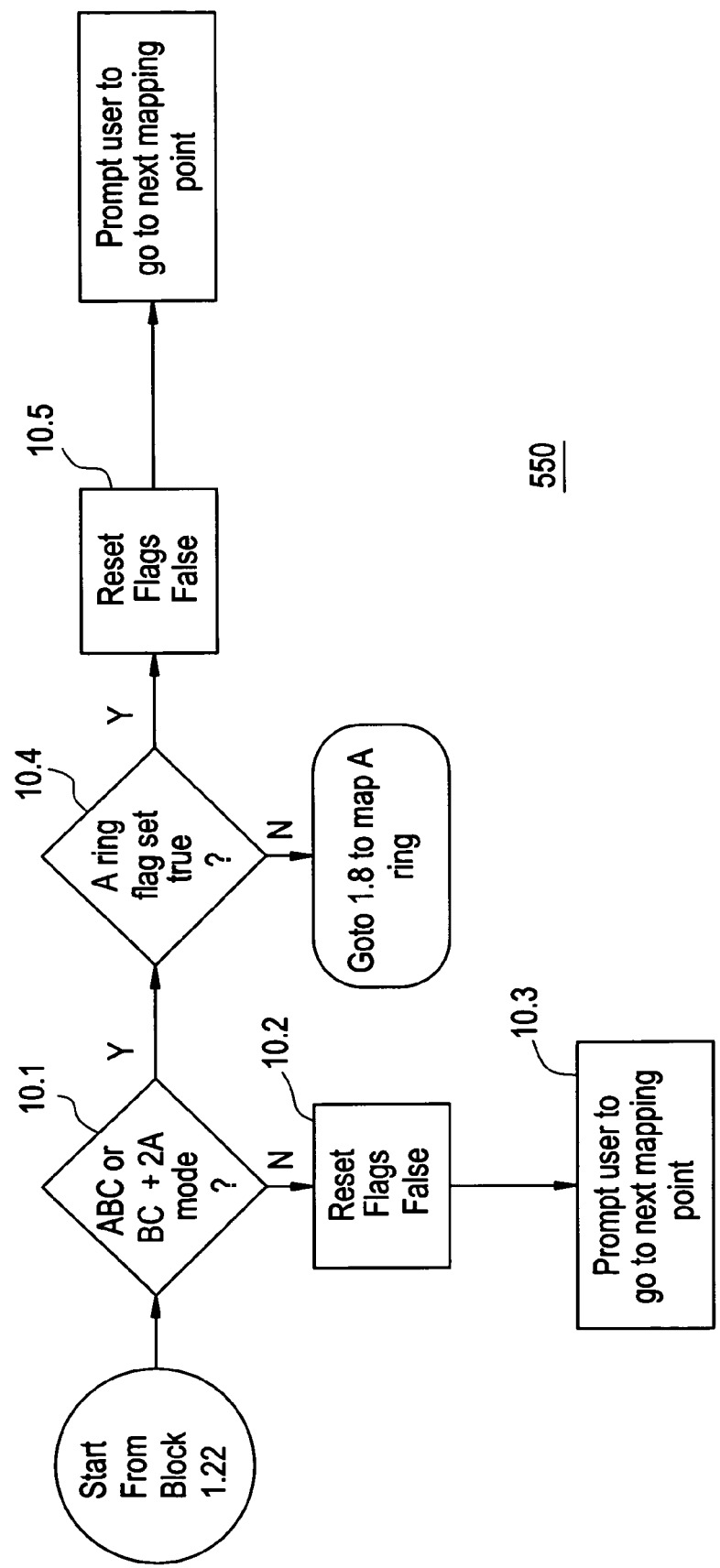
FIG. 12 is a flow chart depicting a procedure to determine the next mapping condition, as used in block 1.22 of FIG. 3.

Procedure 500 then continues to block 9.17, where the current CO reading is compared to a predetermined value, which is less than the value used in block 9.10. If, in block 9.17, the current CO reading is less than or equal to the predetermined value, then no blowout boundary has been detected (block 9.4), and the maximum or minimum temperature boundary procedure 300, 350 continues at block 5.11 or 6.11. If, in block 9.17, the current CO reading is greater than the predetermined value, then procedure 500 continues to block 9.18, where the temperature increment in block 5.3 or block 6.3 is decreased by half. Again, no blowout boundary has been detected (block 9.4), and the maximum or minimum temperature boundary procedure 300, 350 continues at block 5.11 or 6.11. FIG. 12 is a flow chart for a procedure, generally shown as 550, used in block 1.22 of method 100 to determine the next mapping condition. Procedure 550, along with procedure 250 of FIG. 6, allows mapping method 100 of FIG. 1 to automatically select and map a number of burner modes. After starting, procedure 550 continues to block 10.1 where it is determined whether or not the current burner mode requires the operation of all domes (e.g. all of domes A, B, and C, or all of domes B and C and part of dome A). This is determined from flags set in block 4.1 of method 250. If all domes are not required, then procedure 550 continues to block 10.2 where all flags are reset, and then to block 10.3 where the user is prompted to go to the next mapping point (i.e. mode/bleed combination).

If, in block 10.1, it is determined that the current burner mode does not require the operation of all domes, then procedure 550 continues to block 10.4. In block 10.4 it is determined whether or not the A ring flag was set to true in block 4.1 of method 250. If the A ring flag is not set to true, then method 100 continues at block 1.8 where the A ring is adjusted. If, in block 10.4, the A ring has been set to true, then procedure 550 continues to blocks 10.5 and 10.6. In blocks 10.5 and 10.6, all flags are reset and the user is prompted to go to the next mapping point.

The combustor mapping method described herein, by automating the mapping process, reduces the time previously required to map a combustor in a gas turbine engine and substantially reduces the opportunity for human error. In addition, special classroom and hands-on training are no longer required for a user to become qualified to properly map a particular engine. The user simply starts the mapping program and reviews the output. As a result, the money and time cost of training personnel for the combustor mapping process has been greatly reduced.

The method for mapping described herein also improves the quality of the mapping process. The method allows the simultaneous use of all known means to detect a blowout boundary (CO/UHC emissions, closing of bleed, change in blowout parameter), thus increasing the accuracy of boundary determination. In addition, the method checks emissions parameters and instrumentation diagnostics to alert the user of likely instrumentation malfunctions.

The method and procedures described herein can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While a preferred embodiment has been shown and described, various modifications and substitutions may be made thereto without departing from the spirit and scope of the invention. Accordingly, it is to be understood that the present invention has been described by way of illustration and not limitation.

The invention claimed is:

1. A method of measuring and recording operational boundaries for a gas turbine engine, the operational boundaries utilized by a controller associated with the gas turbine engine, the method comprising:

determining a first burner dome to be adjusted in said gas turbine engine for a first burner mode;

upwardly adjusting a ring flame temperature at said first burner dome in said gas turbine engine so as to determine a maximum ring flame temperature operational boundary for said first burner dome upon determination of one or more of: lean blowout conditions, exceeded predefined liner and dome metal temperature limits, combustion dynamic pressures, and emissions limits, with the determined maximum ring flame temperature operational boundary representing a maximum ring flame temperature to be permitted by the controller;

recording into memory a plurality of parameters from a plurality of sensors coupled to said gas turbine engine operating at said determined maximum ring flame temperature operational boundary;

downwardly adjusting said ring flame temperature at said first burner dome in said gas turbine engine so as to determine a minimum ring flame temperature operational boundary for said first burner dome upon determination of one or more of: lean blowout conditions, exceeded predefined liner and dome metal temperature limits, combustion dynamic pressures, and emissions limits, the determined minimum ring flame temperature operational boundary representing a minimum ring flame temperature to be permitted by the controller;

recording into memory a plurality of parameters from said plurality of sensors coupled to the gas turbine engine operating at said determined minimum ring flame temperature operational boundary;

subtracting a minimum ring flame temperature corresponding to said minimum ring flame temperature operational boundary from a maximum ring flame temperature corresponding to said maximum ring flame temperature operational boundary to determine a temperature window size;

defining a nominal ring flame temperature by calculation from the minimum and maximum ring flame temperatures when said temperature window size is greater than a predetermined minimum window size, the nominal ring flame temperature representing a specified normal ring flame temperature under normal operating conditions;

adjusting the ring flame temperature in said first burner dome to said nominal ring flame temperature; and recording into memory a plurality of parameters from said sensors coupled to the gas turbine engine operating at said nominal ring flame temperature.

2. The method of claim 1, further comprising:

before said determining said first burner dome to be adjusted, adjusting a bulk combustor flame temperature from said gas turbine engine until readings from said plurality of sensors coupled to said gas turbine engine are within predetermined operating limits.

3. The method of claim 2, wherein said readings from said plurality of sensors include a NOx emissions level; and said adjusting said bulk combustor flame temperature includes:

increasing said bulk combustor flame temperature in said gas turbine engine if said NOx emissions level is less than a predetermined lower limit NOx emissions level.

4. The method of claim 2, wherein said readings from said plurality of sensors include a CO emissions level; and said adjusting said bulk combustor flame temperature includes:

increasing said bulk combustor flame temperature in said gas turbine engine if said CO emissions level is greater than an upper limit CO emissions level.

5. The method of claim 2, wherein said readings from said plurality of sensors include a NOx emissions level; and said adjusting said bulk combustor flame temperature includes:

decreasing said bulk combustor flame temperature if said NOx emissions level is greater than a predetermined upper limit NOx emissions level for said gas turbine engine.

6. The method of claim 2, wherein said adjusting said bulk combustor flame temperature includes:

decreasing said bulk combustor flame temperature if said bulk combustor flame temperature is greater than a predetermined upper limit bulk combustor flame temperature.

7. The method of claim 2, wherein said readings from said plurality of sensors include a high pressure turbine outlet temperature; and
said adjusting said bulk combustor flame temperature further includes:
decreasing said bulk combustor flame temperature if said bulk high pressure turbine outlet temperature is greater than a predetermined upper limit high pressure turbine outlet temperature.

8. The method of claim 2, further comprising:
activating an alarm if said adjusting said bulk combustor flame temperature is performed a number of times greater than a predetermined number of times.

9. The method of claim 2, further comprising:
repeating said adjusting said bulk combustor flame temperature if a NOx emissions level at said maximum temperature operational boundary is less than a predetermined upper limit NOx emissions level and said temperature window size is less than said predetermined minimum window size.

10. The method of claim 2, further comprising:
repeating said adjusting said bulk combustor flame temperature if a NOx emissions level at said minimum temperature operational boundary is less than a predetermined upper limit NOx emissions level and said temperature window size is less than said predetermined minimum window size.

11. The method of claim 2, further comprising:
repeating said adjusting said bulk combustor flame temperature if a high pressure turbine outlet temperature at said maximum temperature operational boundary is less than a predetermined upper limit high pressure turbine outlet temperature and said temperature window size is less than said predetermined minimum window size.

12. The method of claim 2, further comprising:
repeating said adjusting said bulk combustor flame temperature if a high pressure turbine outlet temperature at said minimum temperature operational boundary is less than a predetermined upper limit high pressure turbine outlet temperature and said temperature window size is less than said predetermined minimum window size.

13. The method of claim 1, further comprising:
activating an alarm if a NOx emissions level at said maximum temperature operational boundary is greater than a predetermined upper limit NOx emissions level and said temperature window size is less than said predetermined minimum window size.

14. The method of claim 2, further comprising:
repeating said adjusting said bulk combustor flame temperature if a high pressure turbine outlet temperature at said nominal ring flame temperature is greater than a predetermined upper limit high pressure turbine outlet temperature.

15. The method of claim 2, further comprising:
repeating said adjusting said bulk combustor flame temperature if a NOx emissions level at said nominal ring flame temperature is greater than a predetermined upper limit NOx emissions level limit.

16. The method of claim 1, further comprising:
activating an alarm if a NOx emissions level at said minimum temperature operational boundary is greater than a predetermined upper limit NOx emissions level and said temperature window size is less than said predetermined minimum window size.

17. The method of claim 1, further comprising:
activating an alarm if a high pressure turbine outlet temperature at said maximum temperature operational boundary is greater than a predetermined upper limit high pressure turbine outlet temperature and said temperature window size is less than said predetermined minimum window size.

18. The method of claim 1, further comprising:
activating an alarm if a high pressure turbine outlet temperature at said minimum temperature operational boundary is greater than a predetermined upper limit high pressure turbine outlet temperature and said temperature window size is less than said predetermined minimum window size.

19. The method of claim 1, wherein said determining said first burner dome to be adjusted includes:
selecting said first burner mode in a lookup table to determine a sequence of burner domes to be adjusted for said first burner mode; and
selecting said first burner dome from said sequence of burner domes to be adjusted.

20. The method of claim 19, wherein said selecting said first burner dome includes:
setting a flag to identify an adjusted burner dome in said plurality of burner domes to be adjusted for said first burner mode.

21. The method of claim 1, wherein said adjusting a ring flame temperature at said first burner dome in said gas turbine engine to determine a maximum ring flame temperature operational boundary includes:
incrementing said ring flame temperature at said first burner dome in said gas turbine engine by a predetermined amount; and
detecting the activation of a acoustics and blow out avoidance logic.

22. The method of claim 1, wherein said adjusting a ring flame temperature at said first burner dome in said gas turbine engine to determine a maximum ring flame temperature operational boundary includes:
incrementing said ring flame temperature at said first burner dome in said gas turbine engine by a predetermined amount to achieve an incremented ring flame temperature;
recording into memory a plurality of parameters from said plurality of sensors coupled to said gas turbine engine operating at said incremented ring flame temperature; and
repeating said incrementing if said plurality of parameters are within predetermined acoustics and blowout boundaries.

23. The method of claim 1, wherein said adjusting a ring flame temperature at said first burner dome in said gas turbine engine to determine a maximum ring flame temperature operational boundary includes:
incrementing said ring flame temperature at said first burner dome in said gas turbine engine by a predetermined amount to achieve an incremented ring flame temperature;
recording into memory a plurality of parameters from said plurality of sensors coupled to said gas turbine engine operating at said incremented ring flame temperature; and
repeating said incrementing if said plurality of parameters are within predetermined acoustics and blowout boundaries and said ring flame temperature at said first burner dome is less than a predetermined maximum ring flame temperature.

24. The method of claim 1, wherein said adjusting a ring flame temperature at said first burner dome in said gas turbine engine to determine a minimum ring flame temperature operational boundary includes:

decrementing said ring flame temperature at said first burner dome in said gas turbine engine by a predetermined amount; and detecting the activation of a acoustics and blow out avoidance logic.

25. The method of claim 1, wherein said adjusting a ring flame temperature at said first burner dome in said gas turbine engine to determine a minimum ring flame temperature operational boundary includes:

decrementing said ring flame temperature at said first burner dome in said gas turbine engine by a predetermined amount to achieve an decremented ring flame temperature;

recording into memory a plurality of parameters from said plurality of sensors coupled to said gas turbine engine operating at said decremented ring flame temperature; and repeating said decrementing if said plurality of parameters are within predetermined acoustics and blowout boundaries.

26. The method of claim 1, wherein said calculating said nominal ring flame temperature includes:

incrementing said ring flame temperature at said minimum ring flame temperature operational boundary by a predetermined amount.

27. The method of claim 1, wherein said calculating said nominal ring flame temperature includes:

decrementing said ring flame temperature at said maximum ring flame temperature operational boundary by a predetermined amount.

28. The method of claim 1, wherein said calculating said nominal ring flame temperature includes:

averaging said ring flame temperature at said maximum ring flame temperature operational boundary and said ring flame temperature at said minimum ring flame temperature operational boundary.

29. The method of claim 1, further comprising:

determining a second burner dome to be adjusted for said first burner mode when said high pressure turbine outlet temperature at said nominal ring flame temperature is less than a predetermined upper limit high pressure turbine outlet temperature and a NOx emissions level at said nominal ring flame temperature is less than a predetermined upper limit NOx emissions level.

30. The method of claim 1, further comprising:

receiving input indicating a new burner mode if all burner domes for said first mode have been adjusted.

* * * * *